Figures 1, 2:
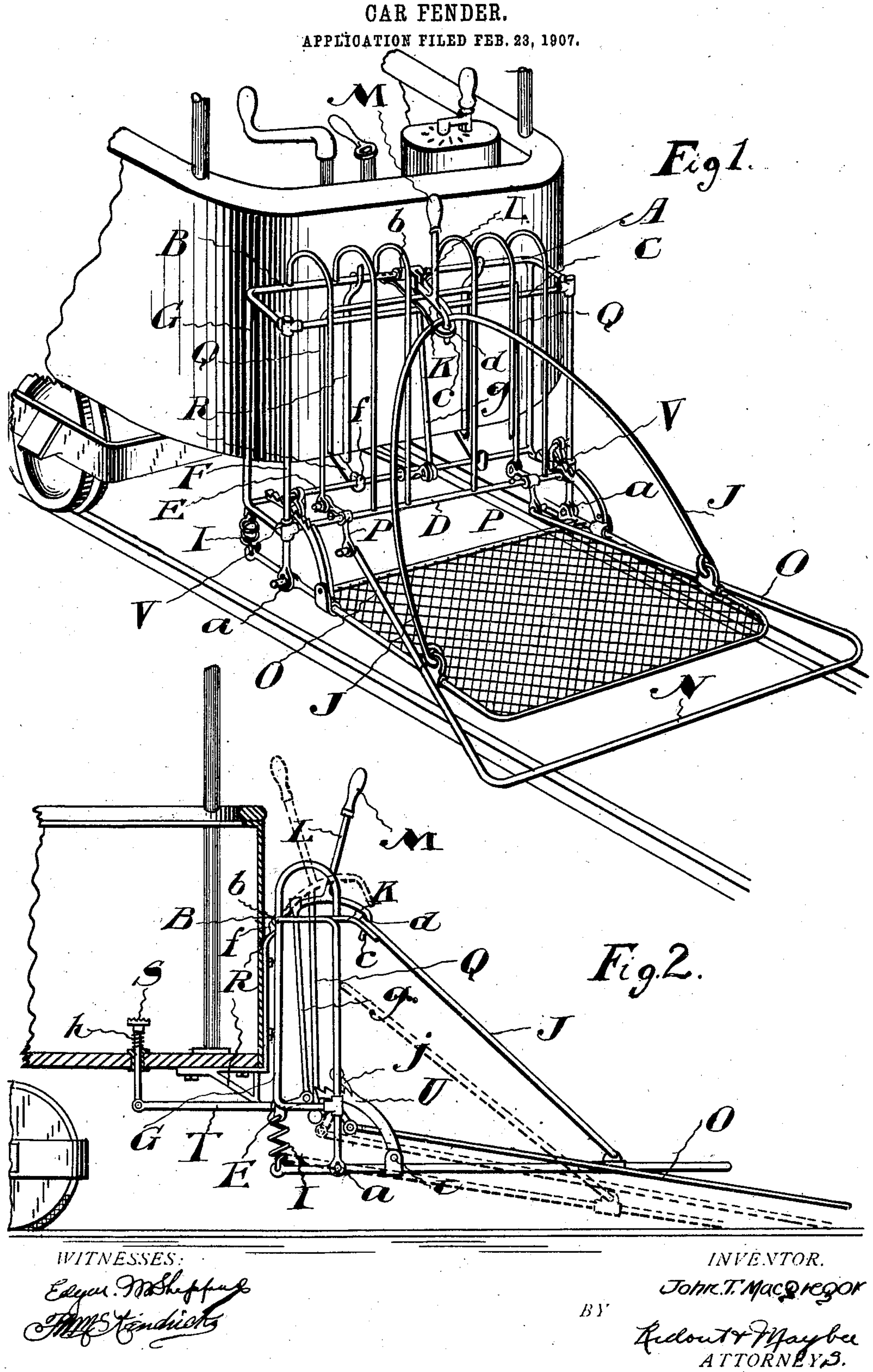

No. 862,261. PATENTED AUG. 6, 1907.

J. T. MACGREGOR.

CAR FENDER.

APPLICATION FILED FEB. 23, 1907.

WITNESSES:

Edgar McSheppard

J. McKendrick

INVENTOR.

John T. MacGregor

BY

Ridout & Maybee

ATTORNEYS.

THE NORRIS PETERS CO., WASHINGTON, D. C.

UNITED STATES PATENT OFFICE.

JOHN T. MACGREGOR, OF GALT, ONTARIO, CANADA, ASSIGNOR OF ONE-FOURTH TO JEROME C. DIETRICH, ONE-FOURTH TO PERSIE G. DIETRICH, AND ONE-FOURTH TO FRED D. PALMER, ALL OF GALT, CANADA.

CAR-FENDER.

No. 862,261. Specification of Letters Patent. Patented Aug. 6, 1907.

Application filed February 23, 1907. Serial No. 358,923.

*To all whom it may concern:*

Be it known that I, JOHN T. MACGREGOR, of the town of Galt, in the county of Waterloo, Province of Ontario, Canada, have invented certain new and useful Improvements in Car-Fenders, of which the following is a specification.

My object is to devise a fender for cars which (1) may be tripped either automatically by contact with an obstacle on the track, by hand or by pressure of the foot (2) may be detached from the car or attached thereto in the shortest possible time (3) automatically locks itself down when tripped (4) is simple and easily constructed, and my invention consists essentially of the constructions hereinafter more specifically described and then definitely claimed.

Figure 1 is a perspective view of my improved fender. Fig. 2 is a side elevation showing the fender connected to a car platform, the position of the fender when tripped being indicated in dotted lines.

In the drawings like letters of reference indicate corresponding parts in the different figures.

A. is the vertical frame of the fender. This preferably comprises four horizontal bars B, C, D, E, connecting rectangular end frames F. The vertical fender bars G are preferably connected to the horizontal bars E, B, C, as shown. The fender H is pivoted at *a* on downward extensions of the end frames F. The side bars of the fender preferably extend rearwardly of these pivots and have coil springs I connected thereto, the other ends of these springs being connected to any suitable part of the fender frame or other stationary part. These coil springs it will be seen tend to throw the pivoted fender down to the position shown in dotted lines in Fig. 2. The fender is normally maintained in its raised position by the bail J, which is pivoted on the side bars of the fender and at its center engages a releasable lock. This lock comprises a plate K secured to the upper horizontal bars B and E. Pivoted at *b* is a latch L provided with an upwardly extending handle M. The end *c* of this latch is adapted to enter the hole *d* in the plate K. When the fender is in its raised position the center of the bail lies behind the end *c* of the latch, as shown, and is securely held in position.

When the motorman desires to drop the fender he may do so by grasping the handle M and raising the latch L, thus releasing the bail and allowing the fender to drop. As it is desirable that the fender shall be adapted to drop automatically on contact with an obstacle on the track, I provide the trigger frame N, which is provided with a rearwardly extending side bars O, preferably sliding through eyes *e* secured to the sides of the fender. These side bars O are pivotally connected with bell crank levers P fulcrumed on the horizontal bar D. The other ends of these levers are connected with a U-shaped frame Q, the upper part of which passes below the latch L. It will be seen that on contact with an obstacle the trigger frame N will be pushed rearwardly, thus rocking the bell crank levers and releasing the lock. The weight of the fender at once causes it to drop to the ground, being assisted by the tension of the springs I.

The fender is connected with the platform of the car by means of brackets R. These brackets are securely fastened to the platform and are provided with hooks *f* into which the horizontal bars B and E may be dropped, as shown in Fig. 2. It is also desirable to provide means whereby the motorman may put the fender by foot instead of by hand. For this purpose I employ a headed plunger S vertically movable in a hole in the car platform. The lower end of this plunger is connected by means of a pin, or any other suitable manner, with a lever T. This lever is fulcrumed on the bar E and engages a vertical rod G, the upper end of which passes through the plate G into a position to engage the latch L. A coil spring *h* engages the head of the plunger in the car platform and serves to maintain all the parts in their normal position. When the plunger is depressed by the foot the rod *g* will be raised and the latch released allowing the car fender to drop. It will be seen then that the fender may be removed from the car at any time by simply removing the pin securing the plunger S in engagement with the lever T and by lifting the fender frame from the hooks *f*. The fender may at any time be hinged up against the front of the car when the cars are run into the barns. I find it desirable also to provide means for locking the fender in its down position to prevent it from lifting over obstructions on the track. For this purpose I employ ratchet quadrants U, which are secured to the fender at each side preferably by means of pivotal connections *i*. These ratchet quadrants pass through guides V formed on or secured to the end frames F. Each guide is also provided with a pivoted dog *j*, or other suitable means for engaging the ratchet teeth of the quadrants U. It will be seen that these dogs permit of the dropping of the fender, but will instantly lock it against any upward movement until they have been released by hand.

From the construction above described it will be seen that I have secured the results set out in the preamble of this specification as being the object of my invention.

What I claim as my invention is:—

1. A fender pivotally connected at its rearward end upon a car; in combination with means for locking said fender with its forward end above the ground level; means for automatically tripping said fender by contact with an obstacle in front thereof; means for tripping said fender by hand; and means convenient to the motorman's foot for operating the hand trip, substantially as described.

2. A fender pivotally connected at its rearward end upon a car so that it may be dropped to the ground level; in combination with releasable means for locking said fender with its forward end above the ground level; ratchet quadrants connected to the fender and moving therewith; stationary guides for said quadrants supported by the car; and engaging means on said guides for the ratchets to hold the quadrants as they are moved through the guides by the dropping of the fender, substantially as described.

3. A fender pivotally connected at its rearward end upon a car so that it may be dropped to the ground level; in combination with a supported bail pivoted on the fender in front of the fender pivots; and a releasable lock carried by the car above the fender adapted to engage the center of the bail whereby the fender is releasably supported with its forward end above the ground level, substantially as described.

4. A fender pivotally connected at its rearward end upon a car; in combination with a bail pivoted on the fender in front of the fender pivots; a releasable lock carried by the car above the fender adapted to engage the center of the bail; a trigger frame carried on the fender and normally projecting in front thereof; suitably pivoted bell crank levers to which the rear ends of the trigger frame are pivotally connected; and means operated by the bell crank levers for releasing the lock, substantially as described.

5. A fender pivotally connected at its rearward end upon a car; in combination with a bail pivoted on the fender in front of the fender pivots; a releasable lock carried by the car above the fender adapted to engage the center of the bail, and means for automatically tripping said lock to release the bail on contact with an obstacle in front of the fender, substantially as described.

6. A fender; in combination with a fender frame on which the said fender is pivoted; a car platform; two pairs of hooks carried thereby on which the fender is adapted to be hung; a releasable lock carried by said frame and adapted to lock the fender with its forward end above the ground; a lever pivoted on the frame, adapted to trip said lock and extending rearwardly under the car platform; a headed plunger working through the car platform engaging and pivoted to said lever; a removable pivot pin passed through said plunger and the lever; and a spring engaging the car and the plunger head tending to maintain the parts in their normal position, substantially as described.

7. A fender pivotally connected at its rearward end upon a car in combination with a bail pivoted on the fender in front of the fender pivots; a plate on which the center of the bail may rest; and a latch pivoted on the plate and adapted to enter a hole in the plate in front of the latch, substantially as described.

Galt, Ont., 8th February, 1907.

JOHN T. MACGREGOR.

Signed in the presence of—
NINA E. MALCOLM,
WILLIE C. RUPPEL.